C. NELSON.
TORPEDO.
No. 7,015. Reissued March 28, 1876.
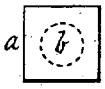
Witnesses:
Edwin James.
John K. Jones.
Inventor:
Charles Nelson.
per J. E. T. Holmead.
Attorney.
N. PETERS, PHOTO-LITHOGRAPHER, WASHINGTON, D. C.

UNITED STATES PATENT OFFICE.

CHARLES NELSON, OF EAST NEW YORK, N. Y.

IMPROVEMENT IN TORPEDOES.

Specification forming part of Letters Patent No. 136,000, dated February 18, 1873; reissue No. 7,015, dated March 28, 1876; application filed March 17, 1876.

DIVISION A.

*To all whom it may concern:*

Be it known that I, CHARLES NELSON, of East New York, in the county of Kings and State of New York, invented certain Improvements in Torpedoes, on which Letters Patent of the United States were granted to me February 18, 1873, No. 136,000; that I am now the sole owner of said Letters Patent, and that the following is a full, clear, and exact description of the same, reference being had to the accompanying drawing and the letters of reference marked thereon, making part of this specification, in which is represented a top-plan view of my invention.

In the construction of torpedoes previous to my invention, it was the invariable custom of all manufacturers to apply the composition that constitutes the fulminate in comminuted or powdered condition, and in a manner that permitted of the different particles of the fulminate freely commingling and mixing with the fine gravel or other filling of the torpedo, and which, as is well known, was most objectionable, as there is always more or less danger, in transporting or handling the same, that through rough usage or carelessness such a frictional contact may be produced between the comminuted fulminate and other ingredients as to endanger the explosion of the former at a time and under circumstances most undesirable. In my improvement all this difficulty is remedied, and through a most simple and practical expedient, and which constitutes and fully explains the entire nature of my invention.

To keep the fulminate separate or prevent its mixing with the other ingredients, I so prepare the same as to permit of its being attached to one side of a small piece of paper, on which it is so secured as to prevent its disintegration, and such a separation from the gravel or other filling as to guard against all danger of the fulminate being exploded except through a concussion as direct and violent as that to which the torpedo is exposed when designedly thrown or fired.

The construction and operation of my invention are as follows:

In the accompanying drawing a torpedo is not shown, but only the feature or ingredient thereof which constitutes my invention or improvement, and in which *a* represents a little paper piece, with the fulminate *b* attached to one side thereof. This piece of paper, with the fulminate attached, is placed in the paper pouch or pocket that is to constitute the wrapper, and the fine gravel or other filling is then applied, and the torpedo is otherwise formed and secured in the usual manner.

What I claim as new, and desire to secure by Letters Patent of the United States, is—

A torpedo in which the fulminate is kept separate from the gravel or other filling by being secured or attached to a piece of paper, substantially as and for the purpose specified.

In testimony whereof I have signed my name to this specification before two subscribing witnesses.

CHAS. NELSON.

Witnesses:

EDWARD F. LINTON,

RICHD. PICKERING.